(12) United States Patent
Fritz

(10) Patent No.: US 12,431,252 B2
(45) Date of Patent: Sep. 30, 2025

(54) CABLE FEEDTHROUGH FOR RADIOACTIVE ENVIRONMENTS

(71) Applicant: Schott AG, Mainz (DE)

(72) Inventor: Oliver Fritz, Obersüßbach (DE)

(73) Assignee: Schott AG, Mainz (DE)

( * ) Notice: Subject to any disclaimer, the term of this patent is extended or adjusted under 35 U.S.C. 154(b) by 488 days.

(21) Appl. No.: 17/887,008

(22) Filed: Aug. 12, 2022

(65) Prior Publication Data

US 2022/0392656 A1  Dec. 8, 2022

Related U.S. Application Data

(63) Continuation of application No. PCT/EP2021/052073, filed on Jan. 29, 2021.

(51) Int. Cl.
| | |
|---|---|
| *G21C 17/116* | (2006.01) |
| *G21C 11/02* | (2006.01) |
| *G21C 13/028* | (2006.01) |
| *H01B 17/30* | (2006.01) |
| *H02G 3/22* | (2006.01) |

(52) U.S. Cl.
CPC ......... *G21C 17/116* (2013.01); *G21C 11/026* (2013.01); *G21C 13/028* (2013.01); *H01B 17/30* (2013.01); *G21C 11/028* (2013.01); *H02G 3/22* (2013.01)

(58) Field of Classification Search
CPC .. G21C 17/116; G21C 11/026; G21C 13/028; G21C 11/028; H01B 17/30; H02G 3/22
USPC ........................................................ 376/203
See application file for complete search history.

(56) References Cited

U.S. PATENT DOCUMENTS

| 3,781,453 A | * | 12/1973 | Funk ................ G21C 17/116 |
|---|---|---|---|
| 8,378,221 B2 | | 2/2013 | Bernauer |
| 9,413,152 B2 | | 8/2016 | Fritz et al. |

(Continued)

FOREIGN PATENT DOCUMENTS

| JP | S50118399 U | * | 9/1975 |
|---|---|---|---|
| JP | H08136694 A | | 5/1996 |

(Continued)

*Primary Examiner* — Jack W Keith
*Assistant Examiner* — Daniel Wasil
(74) *Attorney, Agent, or Firm* — TAYLOR & EDELSTEIN, PC

(57) ABSTRACT

A feedthrough for shielding against radioactive radiation includes electrical feedthrough conductors, a tubular metal housing, a connecting conductor, and shielding bodies. The tubular metal housing includes ends and seals, the ends including a seals so that an interior is formed in the tubular housing between the seals. The seals include an insulating body through which an electrical feedthrough conductor is fed so that the electrical feedthrough conductor is fixed in the seals while electrically insulated from the tubular housing. The connecting conductor extends in the interior and connects an electrical feedthrough conductor at one of the seals to an electrical feedthrough conductor at another of the seals. The shielding bodies, which are respectively interrupted by at least one opening therein, are arranged successively in an axial direction of the tubular housing, the connecting conductor being fed through the opening. The shielding bodies shield against radioactive radiation by way of shielding material.

19 Claims, 3 Drawing Sheets

(56) References Cited

U.S. PATENT DOCUMENTS

2018/0190396 A1* 7/2018 Brun .................... G21C 17/116
2019/0341158 A1* 11/2019 Brun .................... G21C 17/116

FOREIGN PATENT DOCUMENTS

JP        H09-215156 A * 8/1997
JP        H03221895 A * 4/1998

* cited by examiner

CABLE FEEDTHROUGH FOR RADIOACTIVE ENVIRONMENTS

CROSS REFERENCE TO RELATED APPLICATIONS

This is a continuation of PCT Application No. PCT/EP2021/052073, entitled "CABLE FEED-THROUGH FOR RADIOACTIVE ENVIRONMENTS", filed Jan. 29, 2021, which is incorporated herein by reference. PCT Application No. PCT/EP2021/052073 claims priority to German Patent Application No. DE 10 2020 103 873.9, filed Feb. 14, 2020, which is incorporated herein by reference.

BACKGROUND OF THE INVENTION

1. Field of the Invention

The invention relates in general to feedthroughs for feeding electrical signals or currents through walls of hermetically encapsulated environments. In particular, the invention relates to feedthroughs such as are suitable for radioactive environments, for example for nuclear reactors.

2. Description of the Related Art

Feedthroughs for delivering and receiving electrical signals and supply currents in hermetically sealed vessels are known, for example, from DE 10 2009 011 277 A1, DE 10 2009 014 334 A1 and DE 10 2010 055 177 A1.

In nuclear reactors, the challenge is not only to enclose the interior of the reactor hermetically but also to shield the emerging radiation, in the case of gamma radiation, penetrating radiation. It is known to fit shields on the junction boxes in which the field cables are connected to the feedthrough. A feedthrough having junction boxes for use in a reactor safety vessel is described, for example, in the aforementioned DE 10 2010 055 177 A1.

Although such a shielding is very effective, the junction boxes also occupy a not inconsiderable installation space, which represents a problem particularly for compact reactors. In the case of a seismic event, furthermore, the considerable weight of the shielding material, owing to its terminal position, exerts a large lever action on the feedthrough and its fastening on the wall of the reactor or reactor safety vessel, and may lead to mechanical failure and therefore leaks.

What is needed in the art is to provide secure, hermetically sealed, electrical feedthroughs through reactor walls or reactor safety vessel walls, which feedthroughs are particularly compact and radiation-secure.

SUMMARY OF THE INVENTION

The present invention provides a feedthrough, in particular a cable feedthrough, for shielding against penetrating radioactive radiation, having a tubular metal housing, the ends of which are respectively provided with a seal so that a hermetically closed interior is formed in the tubular housing between the seals, wherein the seals respectively include at least one insulating body through which at least one electrical feedthrough conductor is fed so that the feedthrough conductor is fixed in the respective seal while being electrically insulated from the tubular housing, and wherein at least one connecting conductor extending in the interior is provided, which connects an electrical feedthrough conductor at one of the seals to an electrical feedthrough conductor at the other seal, wherein a plurality of shielding bodies, which are respectively interrupted by at least one opening, are arranged successively in the axial direction of the tubular housing, a connecting conductor being fed through the opening.

Depending on the layer thickness of the shielding materials, with this arrangement the radiation emerging from the cable feedthrough on the outer side of a reactor safety vessel can be limited to a specified value.

In order to improve the shielding effect, it is in this case advantageous for neighbouring shielding bodies in the axial direction to be made of different materials from one another. It is not necessary to install different shielding bodies in each case. For example, it is also possible to join together two shielding bodies of the same type, which are then followed in the axial direction by a shielding body made of a different material, which then also has a different type of shielding effect.

At least one of the shielding bodies may include a neutron moderator in the form of a material containing hydrogen. With the neutron moderator, fast neutrons coming from a reactor are slowed in order to increase the cross section for neutron capture. Hydrocarbons, in particular plastics, are particularly suitable as a neutron moderator. At the same time, these may also be used as electrical insulators for the current-carrying connections. According to one optional embodiment, at least one shielding body containing PI plastic or PEEK plastic is in this case provided. PI (PI="polyimide") and PEEK (PEEK="polyether ether ketone") are also particularly suitable as a plastic because of their high melting points. A neutron moderator is particularly suitable in combination with a further shielding body which includes a material having a high cross section for the capture of thermal neutrons. Thus, according to one refinement of the feedthrough, at least one of the shielding bodies includes a neutron-capturing material having an element with a capture cross section for thermal neutrons of more than 10 barns and an atomic number of at least 5, optionally more than 5. Optionally, materials which contain at least one of the elements cadmium, tungsten, silver or a rare earth are used as neutron-capturing materials. Cadmium is optional. This element has a high cross section and is relatively economical. Although cadmium represents a toxic heavy metal, this does not entail a serious disadvantage because of the hermetic containment in the cavity of the feedthrough.

According to yet another refinement, at least one shielding body having a gamma absorber, in particular containing an element with an atomic number of more than 30, is provided. Optional materials are tungsten and lead. Tungsten shields somewhat better than lead, is mechanically very stable and has a high melting point. Lead, on the other hand, is much less expensive. If metallic cadmium is furthermore used for a shielding body, the advantage of the high melting point of tungsten cannot be utilised since cadmium also has a low melting point. Lead is therefore optional as a constituent of a gamma absorber.

According to one refinement of the present invention, the feedthrough is configured as a high-temperature feedthrough, for example for use in a reactor pressure vessel. According to this refinement, the device contains high-melting metal hydrides as a shielding body for the neutron moderation instead of plastics such as polyethylenes, polyether ether ketones or polyimides. In this case, in particular rare earth hydrides as well as zirconium hydride have proven advantageous. As an alternative or in addition, the feedthrough may contain high-melting inorganic boron compounds, for example boron nitride, boron carbide in pure form or as a constituent of boron-aluminium alloys (Boral), as a neutron absorber. In this way, in particular, cadmium may be replaced as a neutron absorber and the feedthrough may therefore also be used in environments with temperatures above the melting point of cadmium. As an alternative or in addition, materials whose melting point for the environmental temperature of a high-temperature application, for example lead, are replaced with tungsten in pure form or as a constituent of high-melting alloys for the shielding of gamma radiation. The use of tungsten is in this case particularly advantageous since, besides a good absorption cross section, tungsten has a high melting point of 3422° C. By the described modifications, the feedthrough may according to this refinement also be used for example in regions with high operating temperatures, for example in the primary circuit, particularly of so-called small modular reactors.

According to one refinement of the invention, the opening in the shielding body is arranged at a distance from the inner wall of the tubular housing, so that the connecting conductor is held at a distance from the inner wall.

According to another embodiment, as an alternative or in addition, the openings of the individual shielding bodies are offset with respect to one another. In this case, the openings of successive shielding bodies may be rotated relative to one another and/or displaced with respect to one another in at least one plane. The pattern of holes formed by this arrangement of the openings with respect to one another in this case ensures that radioactive radiation does not pass through the feedthrough in the region of the openings without having to cross at least one shielding plate.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
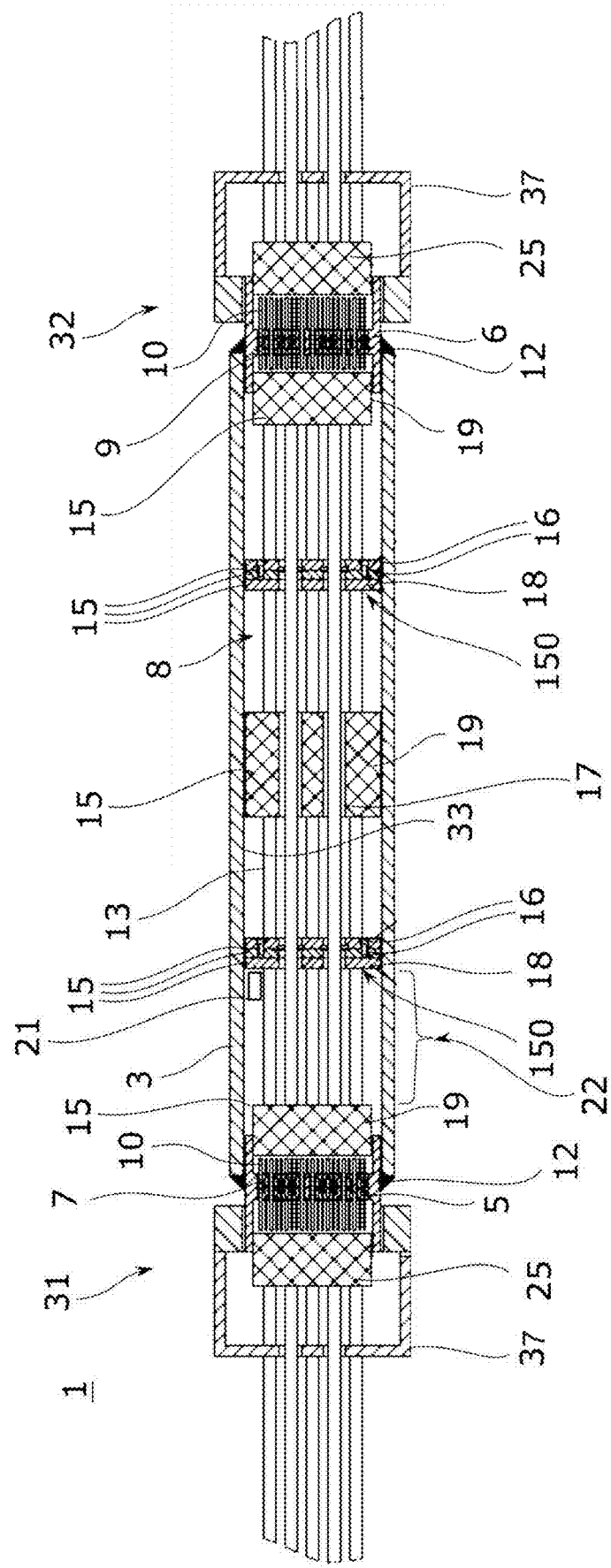
FIG. 1 shows a cross-sectional view of a feedthrough.

FIG. 1 shows a feedthrough, here a cable feedthrough 1, in a cross-sectional view. The cable feedthrough 1 of this example is configured in such a way that particularly good shielding against penetrating radioactive radiation of a reactor is achieved when the end 31 shown on the left in the representation protrudes into the reactor or reactor safety vessel, or provides the internal electrical connections. The external lines are connected at the opposite end 32. The aim is to achieve substantial shielding despite the compact structure. In particular neutrons and gamma radiation are in this case relevant for the penetrating radiation from the reactor.

The cable feedthrough 1 for shielding against penetrating radioactive radiation includes a tubular metal housing 3. For hermetic sealing, the housing 3 may be welded directly to the reactor wall or reactor safety vessel wall. In general, it is therefore optional to use a material which is easily weldable for the housing 3. Particularly suitable for this is steel, which is also recommendable in particular for a reactor vessel or reactor safety vessel made of steel.

The ends 31, 32 of the tubular housing are sealed by seals 5, 6. A hermetically closed interior 8 is therefore formed in the tubular housing 3 between the seals 5, 6. This is advantageous on the one hand in order to contain possible gaseous radioactive reaction products. In particular, the double hermetic seal prevents radioactive substances from emerging even in the event of failure of the feedthrough on one side.

The seals 5, 6 respectively include at least one insulating body 7, 9, through which at least one electrical feedthrough conductor 10 is fed, so that the feedthrough conductor 10 is fixed in the respective seal 5, 6 while being electrically insulated from the tubular housing 3. In one optional configuration, and without restriction to the example represented, at least one of the insulating bodies 7, 9 is an element made of glass, glass-ceramic or ceramic. Optionally both insulating bodies 7, 9 are formed by elements made of glass, glass-ceramic or ceramic. These elements are good electrical insulation materials and can be produced straightforwardly by fusing, or hard soldering in the case of ceramic, into the respective seal.

Typically, a one-to-one allocation is carried out with the feedthrough conductors 10. There are therefore generally also an equal number of feedthrough conductors at both ends. According to one embodiment, the feedthrough may also include sensors and/or actuators, which are connected by way of one or more feedthrough conductors 10. For example, a gamma ray sensor 21 may be provided, which is read out by way of one or more feedthrough conductors. These may, for example, be used to measure the neutron flux in the feedthrough by way of the gamma radiation emitted by a neutron-absorbing material.

Figure 2:
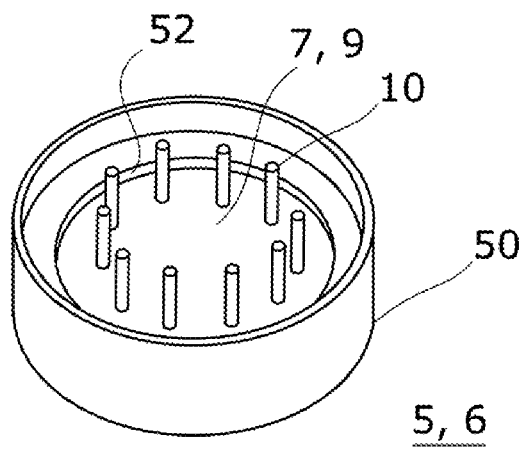
FIGS. 2, 3, 4, and 5 show embodiments of seals of the feedthrough.

The seals 5, 6 may, as represented, be connected to the tubular housing 3 with circumferential weld seams 12. As represented, the seals may have the shape of short tube sections or flanges. FIG. 2 schematically shows a perspective view of a seal 5, 6. The seal 5, 6 includes a metal body 50 which, as mentioned, may have the shape of a flange or tube section. The metal body 50 includes at least one opening 52 in which the insulating body 7, or respectively 9, with the feedthrough conductors 10 held therein is arranged. In particular, the insulating body 7, 9 may be formed from glass, glass-ceramic or ceramic. It may then be produced by fusing glass or glass-ceramic or hard-soldering ceramic in the opening 52. During the fusing or hard soldering, the feedthrough conductors 10 are held in their intended position and are fixed, while being electrically insulated, in the glass, glass-ceramic or ceramic after cooling.

Figure 3:
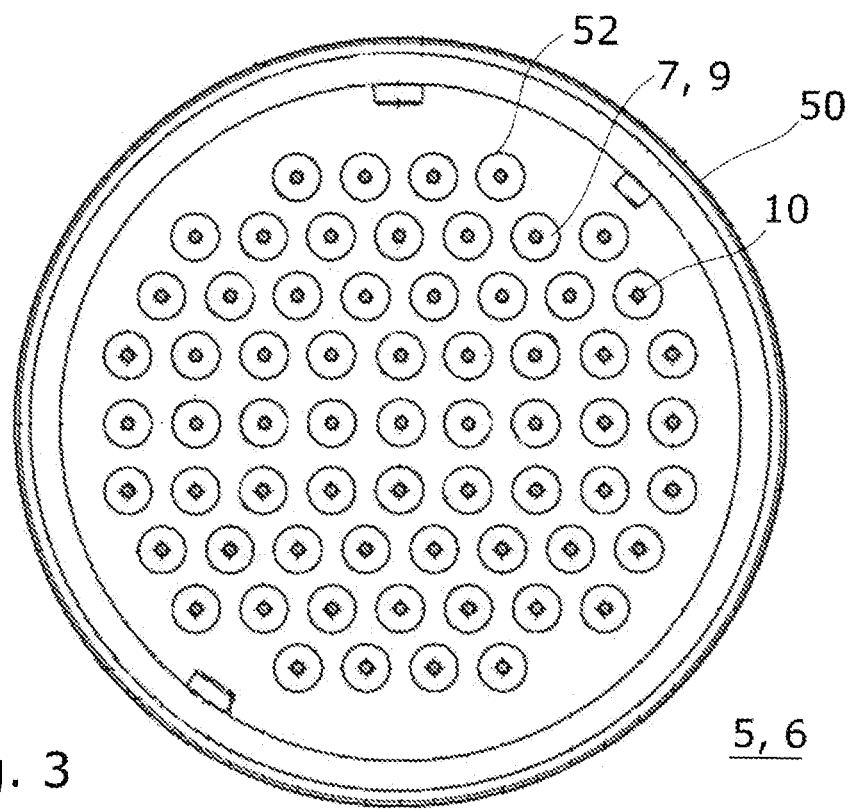
Figure 4:
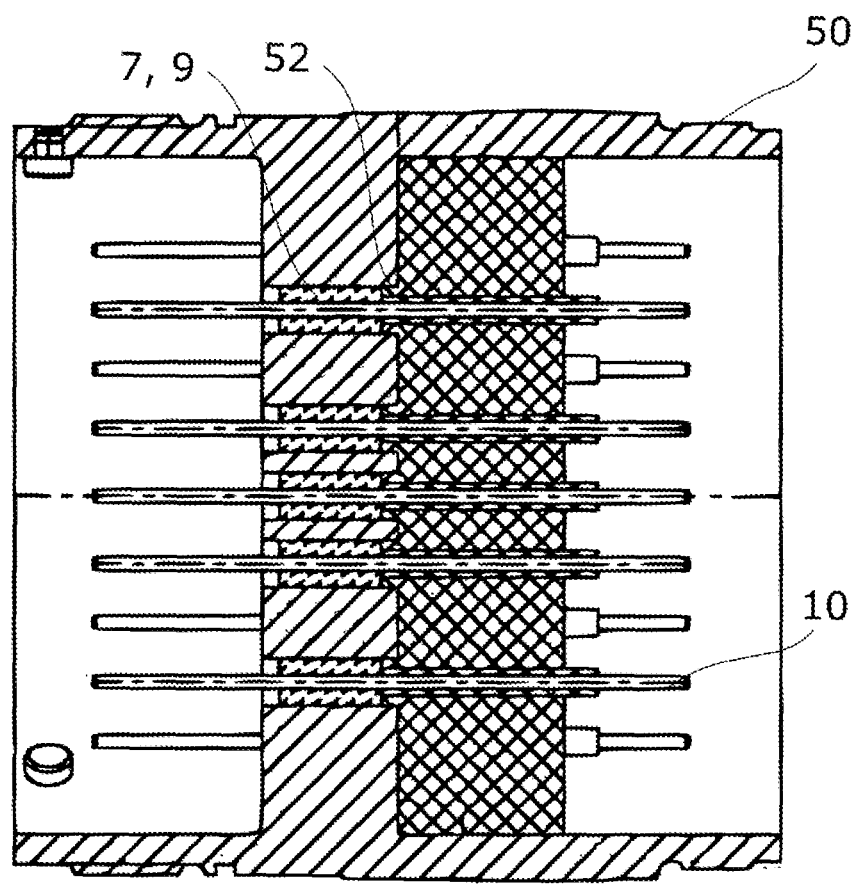

FIG. 3 shows an embodiment of a seal 5, 6 in a plan view, and FIG. 4 shows a sectional view of the seal 5, 6. In contrast to the embodiment according to FIG. 2, the seal according to FIG. 3 and FIG. 4 includes a plurality of insulating bodies 7, and respectively 9. Correspondingly, a plurality of openings 52 in which the insulating bodies 7, 8 are fixed in a sealed manner are also provided. In general, without restriction to the particular example represented, in one embodiment of the invention at least one of the seals 5, 6 of the feedthroughs accordingly includes a plurality of insulating bodies 7, 9, through which at least one feedthrough conductor 10 is respectively fed.

Figure 5:
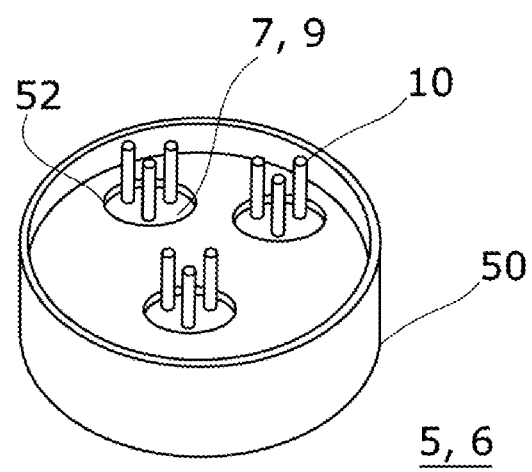

FIG. 5 shows a variant of the examples described above. This variant is based on at least one of the seals 5, 6 including a plurality of openings 52 which are closed with insulating bodies 7, and respectively 9, at least one feedthrough conductor 10 being fixed in at least one of the insulating bodies 7, 9. In the example represented, three insulating bodies 7, 9 are provided, through which three feedthrough conductors 10 are respectively fed. The embodiments with a plurality of openings 52, such as are based on the examples of FIG. 3 to FIG. 5, generally have the advantage of higher pressure resistance in comparison with the embodiment with a single insulating body. On the other hand, the packing density of the feedthrough conductors 10 is limited.

In order to establish an electrical connection with the feedthrough 1, at least one connecting conductor 13 extending in the interior 8 is provided, which connects an electrical feedthrough conductor 10 at one of the seals 5 to an electrical feedthrough conductor 10 at the other seal 6.

Lastly, a plurality of shielding bodies 15, which are respectively interrupted by at least one opening 17, are arranged successively in the axial direction of the tubular housing 3, a connecting conductor 13 being fed through the opening 17. With the combination of a plurality of shielding bodies, effective shielding against penetrating radiation from the interior of the reactor is achieved. This is the case particularly when neighbouring shielding bodies 15 in the axial direction are made of different materials from one another.

In general, it is optional for the opening 17, or the plurality of openings, to be arranged at a distance from the inner wall 33 of the tubular housing 3 so that the connecting conductor 13 is held at a distance from the inner wall 33. With an insulated connecting conductor, conversely, it would also be conceivable to guide it at least locally in contact with the inner wall 33. The connecting conductors 13 may in general be enclosed with an insulating sheath, for example a silicone sheath. Insulation from metal shielding bodies, for instance ones made of tungsten or lead, is therefore also achieved.

In order to achieve effective shielding against neutrons and gamma radiation, the shielding bodies 15 are made of special absorber materials. In order to shield gamma radiation, at least one shielding body 15 having a gamma absorber is provided. This contains an element with an atomic number of more than 30. In order to shield against gamma radiation, tungsten and lead as metals with a very high density have been found to be extremely efficient for this, the former being very expensive and shielding only slightly better than lead.

In the example represented, two stacks 150 of shielding bodies 15 are provided, in which the two shielding bodies facing away from the end 31 are gamma absorbers 16. These gamma absorbers may, as mentioned, be made of tungsten or lead, or may contain at least one of these materials.

During the operation of nuclear reactors, emission of neutrons takes place. Shielding of the latter represents a particular challenge. For shielding against neutrons, a combination of different materials is provided. Fast neutrons, such as are typically emitted from the reactor, are difficult to shield. Provision is made initially to slow them into so-called thermal neutrons, so that they can be absorbed. For this purpose, compounds containing hydrogen are particularly suitable because an ideal momentum transfer and therefore deceleration takes place because of the almost identical masses of the hydrogen atom and the neutron. According to one embodiment, therefore, at least one of the shielding bodies 15 includes a neutron moderator 19 in the form of a material containing hydrogen, in particular a plastic such as PE, PI or PEEK. Optionally, at least one shielding body 15 containing a PEEK plastic is provided for this purpose. Since the plastics PI and PEEK contain many hydrogen atoms, they act as neutron moderators and furthermore fulfill their function as an electrical insulator. Furthermore, PI as well as PEEK have one of the highest melting points among high-performance plastics, which is more than twice as high as that of PE. In a sufficient layer thickness, all fast neutrons are thus slowed into thermal neutrons and can be captured by a neutron absorber.

For the absorption of thermal neutrons, at least one of the shielding bodies 15 includes a neutron-capturing material having an element with a capture cross section for thermal neutrons of more than 10 barns and an atomic number of more than 5. For the capture of thermal neutrons, inter alia materials such as boron (as an alloy with aluminium: Boral) or alternatively cadmium are suitable. Boron in this case has the crucial disadvantage that for each absorbed thermal neutron a boron atom decays into lithium and helium. In this case, a considerable pressure may be built up over time by the helium gas formed in a hermetically closed system, such as the present feedthrough represents, as is the case for example in moderator rods in nuclear reactors. Cadmium, on the other hand, is stable and is merely converted into a heavier isotope. For the application in closed feedthroughs, the latter as well as other elements with an atomic number of more than 5 are therefore to be optional. Besides cadmium, materials having at least one element selected from the group of rare earths, tungsten, silver may also be envisaged as neutron-capturing materials.

During the neutron absorption, gamma radiation is additionally generated, which is then absorbed by a shielding body 15 in the form of a gamma absorber, in particular by tungsten or lead shielding plates. Since at 321° C. the melting point of cadmium is still lower than that of lead (327° C.), the property of the high melting point of tungsten (3422° C.) thus cannot be utilised when using cadmium. Lead is furthermore substantially more favourable. Lead as a gamma absorber is therefore optional particularly when using metallic cadmium as a neutron absorber.

The degree of shielding may be controlled in wide ranges by way of the layer thicknesses of the various absorber materials as well as the number of absorber bodies. With a design such as is shown in FIG. 1, the radiation from the vessel can be shielded substantially fully.

If an organic material, in particular a plastic, is used as a neutron moderator, the problem may arise that gamma radiation acting on it in the course of time leads to a modification of the material. The optional PEEK as well as PI plastics for the neutron moderator or moderators 19 are distinguished by a particularly high resistance to gamma rays. According to one refinement of the invention, the feedthrough is filled with an inert gas, for example nitrogen. As an alternative, the feedthrough may be evacuated. Both measures lead to the number of ionizable particles in the feedthrough being reduced. The radiation-induced aging of the plastic may therefore advantageously be reduced or at least slowed, so that the lifetime of the feedthrough is increased. As an alternative or in addition, degeneration of the neutron moderator may be at least slowed, without restriction to the example represented, according to an optional embodiment by providing two shielding bodies, of which one includes a neutron moderator 19 and a further shielding body 15 is provided with a neutron-capturing material 18.

During the neutron capture, the capturing atoms typically release gamma radiation. In general, as also shown in the example represented, an intermediate space 22 may be provided between the shielding bodies 15 having a neutron moderator 19 and a neutron-capturing material 18. This intermediate space 22 may in this case, other than for instance in the example represented, optionally also be filled entirely or partially with a gamma absorber 16, for example a corresponding shielding body 15. For shielding of all from a reactor or reactor safety vessel and in general vessels filled with radioactive, neutron-emitting material, not only the combination of the various shielding bodies 15 but also their order are advantageous. In order to absorb neutrons and gamma rays at the same time, according to one optional embodiment, at least three shielding bodies 15 are provided, a shielding body 15 having a neutron-capturing material 18 being arranged after a shielding body 15 having a neutron moderator 19 along a direction in the tubular housing 3, and a shielding body 15 having a gamma absorber 16 being arranged after the shielding body 15 having a neutron-capturing material 18 in the tubular housing 3. The cable feedthrough 1 is then, in particular, installed in a vessel in such a way that the aforementioned direction points outwards along the tubular housing 3 from the interior of the vessel. In this way, the neutrons are initially slowed then captured. Both the gamma radiation coming directly from the interior of the vessel and the gamma radiation resulting from the neutron capture in the feedthrough itself may then be captured by the gamma absorber. As in the represented example of FIG. 1, this sequence of shielding bodies may also be repeated at least once.

According to another embodiment, also implemented in the example represented, an insulating closure plate 25 is placed externally on at least one of the insulating bodies 7, 9. These closure plates 25 are used, inter alia, to support the feedthrough conductors 10 laterally. This may, for example, be useful when tensile forces are exerted on the cables externally connected to the feedthrough conductors 10. The feedthrough conductors 10 may protrude from openings in the closure plate 25. It is also conceivable for the feedthrough conductors to end inside the closure plate 25, which consists of an electrically insulating plastic, in channels provided therein and then also to be connected to cables inside the closure plate in the channels. Optionally, a plastic, in particular PEEK or alternatively PI, is also used for the closure plate 25. In general a body made of Boral, or more generally a material containing boron, may additionally be added externally as a neutron moderator, since the creation of helium gas here does not lead to a pressure build-up in the feedthrough. In a feedthrough 1 according to this disclosure, junction boxes or plug connectors 37 may also be provided in order to hold the cables connected up. The junction boxes or plug connectors 37 may, however, be kept compact in comparison with known feedthroughs since the task of absorbing radioactive radiation, which is otherwise performed by materials in the junction box or plug, is already carried out by the shielding bodies 15 in the interior of the feedthrough. Here as well, however, shielding materials may also be accommodated in the junction boxes or plug connectors 37 if space is available for this.

Figure 6:
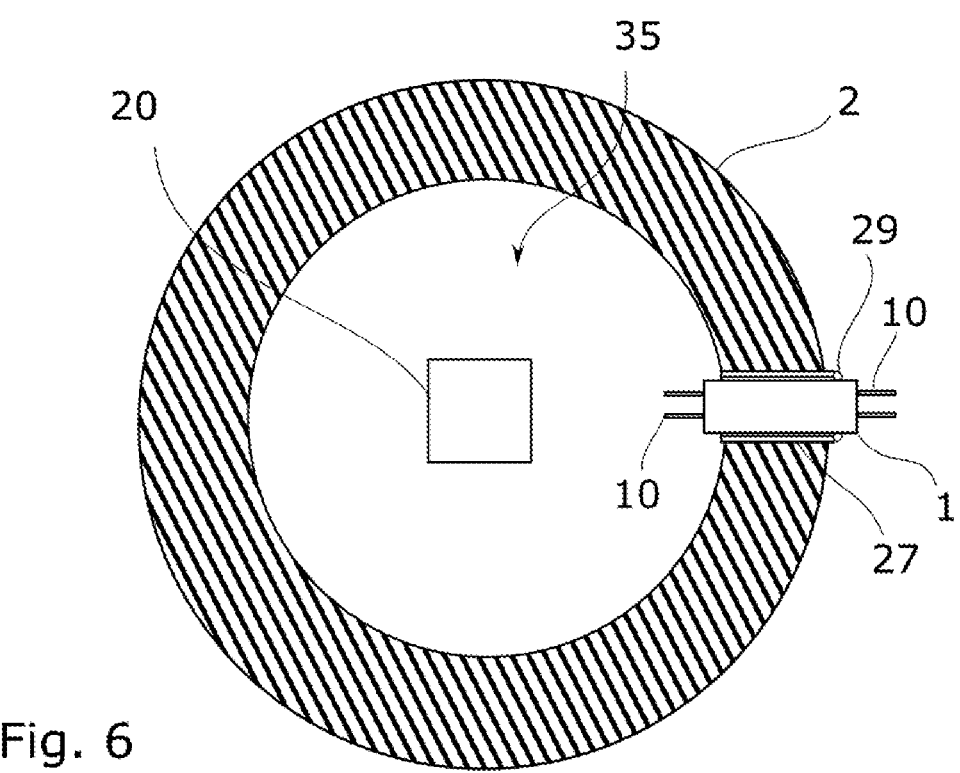
FIG. 6 shows a vessel for containing radioactive material, having a feedthrough.

The tubular housing 3 is optionally made of high-strength steel, which is readily weldable. FIG. 6 in this regard schematically shows an example of a vessel 2 having a cable feedthrough 1 according to a further aspect of this disclosure. The cable feedthrough 1 establishes one or more electrical connections from the environment into the interior 35 of the vessel. The vessel 2 is configured for the containment, for example holding, of radioactive material 20. The vessel 2 may, for example, be configured as a steel or reinforced-concrete shell. In order to use the feedthrough, as represented, a tube 27 may be welded or cast into the vessel wall 2. The feedthrough 1 may then be inserted into the tube 27 and welded tightly to the tube 27 with a circumferential weld seam 29. In the case of a metal vessel 2, the cable feedthrough 1 may also be welded directly to the edge of an opening in the vessel 2. Besides welding, other connecting methods may optionally also be envisaged, for instance screwing. This also applies for the connection of the seals 5, 6 to the tubular housing 3 of the feedthrough 1.

The vessel 2 is, in particular, a reactor vessel or reactor safety vessel of a nuclear reactor. The radioactive material 20 in this case then includes the fuel material of the nuclear reactor or the reactor itself, when the vessel 2 represents the reactor safety vessel. Other vessels 2 for radioactive material may, however, also be envisaged. Because of the compact dimensions, the cable feedthrough 1 is also suitable for transport containers, for instance for transporting fuel rods. As mentioned, the cable feedthrough may include a particular sequence of shielding bodies 15 in order to attenuate radiation emerging from the material 20 in the interior 35. The cable feedthrough to this end includes, in the direction from the interior 35 outwards, a neutron moderator 19, then a neutron-capturing material 18 and behind this a gamma absorber 16.

The cable feedthrough 1 is also suitable in general for use in encapsulated plants in which radioactive material is processed, for example in plants for producing fuel rods or treating radioactive waste.

| List of References | |
|---|---|
| 1 | feedthrough |
| 2 | vessel |
| 3 | tubular housing |
| 31, 32 | ends of 3 |
| 5, 6 | seal of 31, 32 |
| 7, 9 | insulating body |
| 8 | hermetically closed interior |
| 10 | feedthrough conductor |
| 12 | weld seam |
| 13 | connecting conductor |
| 15 | shielding body |
| 16 | gamma absorber |
| 17 | opening in 15 |
| 18 | neutron-capturing material |
| 19, 25 | neutron moderator |
| 22 | intermediate space |
| 25 | closure plate |
| 27 | tube |
| 29 | weld seam |
| 37 | junction box or plug connector |
| 33 | inner wall of 1 |
| 35 | interior of 3 |
| 50 | metal body |
| 52 | opening in 50 |
| 150 | shielding body stack |

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A feedthrough for shielding against a penetrating radioactive radiation, the feedthrough comprising:
    a plurality of electrical feedthrough conductors;
    a tubular metal housing, which is a tubular housing, including a plurality of ends and a plurality of seals, the plurality of ends respectively including a respective one of the plurality of seals so that an interior, which is hermetically enclosed, is formed in the tubular housing between the plurality of seals, the plurality of seals respectively including at least one insulating body through which at least one of the plurality of electrical feedthrough conductors is fed so that the at least one of the plurality of electrical feedthrough conductors is fixed in the plurality of seals respectively while being electrically insulated from the tubular housing;
    at least one connecting conductor extending in the interior, the at least one connecting conductor connecting at least one of the plurality of electrical feedthrough conductors at one of the plurality of seals to at least one of the plurality of electrical feedthrough conductors at another of the plurality of seals; and
    a plurality of shielding bodies, each of which respectively includes at least one opening, the plurality of shielding bodies being arranged successively in an axial direction of the tubular housing, the at least one connecting conductor being fed through the at least one opening, each shielding body being formed as a plate and including at least one of a material suitable for moderating a plurality of neutrons, a material suitable for capturing a plurality of neutrons, and a material suitable for absorbing a plurality of gamma rays, and respective ones of the plurality of shielding bodies neighboring one another in the axial direction and being made of different materials from one another.

2. The feedthrough according to claim 1, wherein at least one of the plurality of shielding bodies comprises a neutron moderator including the material suitable for moderating the plurality of neutrons, which contains a hydrogen, a hydrocarbon, or a plastic.

3. The feedthrough according to claim 2, wherein at least one of the plurality of shielding bodies includes polyimide plastic or polyether ether ketone plastic.

4. The feedthrough according to claim 1, wherein at least one of the plurality of shielding bodies comprises the material suitable for capturing a plurality of neutrons, which is a neutron-capturing material having an element with a capture cross section for a plurality of thermal neutrons of more than 10 barns and an atomic number of more than 5.

5. The feedthrough according to claim 4, wherein at least one of the plurality of shielding bodies includes the neutron-capturing material, which has at least one element selected from a group including at least one rare earth, cadmium, tungsten, and silver.

6. The feedthrough according to claim 4, wherein two of the plurality of shielding bodies are provided, of which one of the two of the plurality of shielding bodies comprises a neutron moderator and the other of the two of the plurality of shielding bodies is provided with the neutron-capturing material, in which case the two of the plurality of shielding bodies are separated from one another so that there is an intermediate space between the two of the plurality of shielding bodies.

7. The feedthrough according to claim 1, wherein at least one of the plurality of shielding bodies has a gamma absorber including an element with an atomic number of more than 30.

8. The feedthrough according to claim 1, wherein at least one of the plurality of shielding bodies includes tungsten or lead.

9. The feedthrough according to claim 1, wherein at least three of the plurality of shielding bodies are provided including a first shielding body, a second shielding body, and a third shielding body, the first shielding body having a neutron-capturing material and being arranged after the second shielding body which has a neutron moderator along a direction in the tubular housing, and the third shielding body having a gamma absorber which is arranged after the first shielding body having the material suitable for capturing a plurality of neutrons, which is a neutron-capturing material.

10. The feedthrough according to claim 1, wherein the tubular housing includes an inner wall, wherein the at least one opening is arranged at a distance from the inner wall of the tubular housing, so that the at least one connecting conductor is held at a distance from the inner wall.

11. The feedthrough according to claim 1, wherein the at least one insulating body comprises a glass, a glass-ceramic, or a ceramic element.

12. The feedthrough according to claim 1, further comprising an insulating closure plate which is placed externally on the at least one insulating body.

13. The feedthrough according to claim 1, wherein the feedthrough is a cable feedthrough, wherein at least one of the plurality of seals of the cable feedthrough comprises a plurality of the at least one insulating body, through which at least one of the plurality of electrical feedthrough conductors is respectively fed.

14. The feedthrough according to claim 13, wherein at least one of the plurality of seals comprises a plurality of openings, which are closed by the at least one insulating body, at least one of the plurality of electrical feedthrough conductors being fixed in the at least one insulating body.

15. A vessel for containing a radioactive material, the vessel comprising:
    a feedthrough for shielding against the radioactive radiation, the feedthrough comprising:
        a plurality of electrical feedthrough conductors;
        a tubular metal housing, which is a tubular housing, including a plurality of ends and a plurality of seals, the plurality of ends respectively including a respective one of the plurality of seals so that an interior, which is hermetically enclosed, is formed in the tubular housing between the plurality of seals, the plurality of seals respectively including at least one insulating body through which at least one of the plurality of electrical feedthrough conductors is fed so that the at least one of the plurality of electrical feedthrough conductors is fixed in the plurality of seals respectively while being electrically insulated from the tubular housing;
        at least one connecting conductor extending in the interior, the at least one connecting conductor connecting at least one of the plurality of electrical feedthrough conductors at one of the plurality of seals to at least one of the plurality of electrical feedthrough conductors at another of the plurality of seals; and
        a plurality of shielding bodies, each of which respectively includes at least one opening, the plurality of shielding bodies being arranged successively in an axial direction of the tubular housing, the at least one connecting conductor being fed through the at least one opening, each shielding body being formed as a plate and including at least one of a material suitable for moderating a plurality of neutrons, a material suitable for capturing a plurality of neutrons, and a material suitable for absorbing a plurality of gamma rays, and respective ones of the plurality of shielding bodies neighboring one another in the axial direction and being made of different materials from one another.

16. The vessel according to claim 15, wherein the vessel is a nuclear reactor pressure vessel.

17. The vessel according to claim 15, wherein the vessel contains a radioactive material, wherein the radioactive material comprises nuclear fuel.

18. The vessel according to claim 17, wherein the vessel is a nuclear reactor pressure vessel.

19. The vessel according to claim 18, wherein the nuclear fuel comprises a plurality of nuclear fuel rods.

* * * * *